United States Patent [19]

Pageaud et al.

[11] Patent Number: 5,291,642
[45] Date of Patent: Mar. 8, 1994

[54] PROCESS TO PRODUCE AT LEAST ONE NON-METALLIZED STRIP ON METALLIZED FLEXIBLE PLASTIC FILM ROLLS AND A PROCESS TO MANUFACTURE STACKED OR WOUND CAPACITORS FROM SUCH ROLLS

[75] Inventors: Michel Pageaud; Thierry Feral, both of Seurre, France

[73] Assignee: Compagnie Europeenne de Composants Electroniques LCC, Courbevoie, France

[21] Appl. No.: 856,369

[22] Filed: Mar. 23, 1992

[30] Foreign Application Priority Data

Mar. 22, 1991 [FR] France ............................ 91 03503

[51] Int. Cl.⁵ .............................................. H01G 4/32
[52] U.S. Cl. .............................. 29/25.42; 219/121.68; 219/121.69
[58] Field of Search ....................... 29/25.42; 242/56.1; 361/323; 219/121.68, 121.69

[56] References Cited

U.S. PATENT DOCUMENTS

| | | | |
|---|---|---|---|
| 4,229,865 | 10/1980 | Fanning | 29/25.42 |
| 4,378,620 | 4/1983 | Lavene . | |
| 4,531,268 | 7/1985 | Rayburn | 29/25.42 |
| 4,633,551 | 1/1987 | Bernard | 29/25.42 |

FOREIGN PATENT DOCUMENTS 0131504  1/1985 European Pat. Off. .
2103198  4/1972 France .

*Primary Examiner*—Carl E. Hall
*Attorney, Agent, or Firm*—Oblon, Spivak, McClelland, Maier & Neustadt

[57] ABSTRACT

A method of producing at least one non-metallized strip on metallized flexible plastic film rolls and a method of producing stacked or wound capacitors using such rolls.

One feature of the process of producing at least one non-metallized strip is that the said non-metallized strip is produced by a laser beam applied to the lateral face of a roll at a non-zero angle of incidence α.

8 Claims, 3 Drawing Sheets step 1 step 1

R step 2 step 3 step 1 step 2 step 3

PROCESS TO PRODUCE AT LEAST ONE NON-METALLIZED STRIP ON METALLIZED FLEXIBLE PLASTIC FILM ROLLS AND A PROCESS TO MANUFACTURE STACKED OR WOUND CAPACITORS FROM SUCH ROLLS

BACKGROUND OF THE INVENTION

This invention is a method of producing at least one non-metallized strip on metallized flexible plastic film rolls.

These rolls are used, for example, to produce metallized flexible plastic film capacitors.

DESCRIPTION OF THE PRIOR ART

At present, plastic films with a metallized area and a non-metallized lateral strip are used to produce stacked or wound metallized flexible plastic film capacitors. These films are produced in two steps.

In the first step, a wide flexible dielectric film, such as a polyester, polycarbonate, polysulfone or similar film, is metallized by a vacuum vapor-deposit process.

This process involves evaporating a metal, such as aluminum, zinc or alloys containing aluminum, zinc, chromium or similar metals.

Non-metallized strips are produced during vacuum vapor-deposit by a system of masking strips which produce non-metallized areas on the wide film.

The system used to position the masking tapes consists of several grooved rollers over which the masking tapes run.

The use of masking tapes has a number of disadvantages.

Firstly, the rollers operate in pairs and it is necessary to have as many spare pairs of rollers as there are different widths of masking tape. In addition, positioning the rollers in the metallization machine is a long, complex procedure since several rollers must be removed and replaced by others each time the width of the non-metallized strips on the film changes.

This method of producing the non-metallized strip has, therefore, the disadvantage of requiring the installation of a special system inside the vacuum vapor-deposit machine.

In a second step, blades cut the wide metallized film to the required final width. The wide metallized film must therefore be cut in the center of the non-metallized strip and in the center of the metallized area between two strips. This requires very accurate positioning of the blades to obtain film rolls of identical width with the right- and left-hand non-metallized strips also of the same width.

A further problem lies in organizing the storage of these film rolls, which must allow for the width of the films and the width of the non-metallized strips on the films.

This is due to the fact that one step in the manufacture of stacked capacitors involves winding at least one pair of film rolls, one with a right-hand non-metallized strip and the other with a left-hand non-metallized strip, onto a large-diameter wheel. To form pairs of rolls, therefore, the films must be chosen such that not only are the film widths very similar but also the widths of the non-metallized strips.

Consequently, it is essential to measure each film width and the width of the non-metallized strip on each film wound into a roll, the rolls then being sorted and stored as a function of the measured results. It can be seen that this method does not allow fully-controlled constitution of stocks of matched rolls.

SUMMARY OF THE INVENTION

This invention therefore proposes a method of eliminating the above disadvantages by using a new method of producing the non-metallized strips on the metallized plastic film.

This invention also proposes a new method of manufacturing stacked or wound metallized flexible plastic film capacitors using such rolls.

Consequently, this invention is a method of producing at least one non-metallized strip on completely metallized flexible plastic film rolls which have already been cut to the required width, in which the non-metallized strip on the roll is produced by applying a laser beam at a non-zero angle of incidence to the roll lateral face.

Applying a laser beam at a non-zero angle of incidence demetallizes the roll to a certain depth. It is therefore possible to control the width of the non-metallized strip produced during the operation by varying the angle of incidence.

BRIEF DESCRIPTION OF DRAWINGS

The invention will be better understood, and other advantages will become clear, upon reading the following description of a preferred embodiment with reference to the appended figures in which:

FIG. 1 describes the three steps used to produced metallized flexible plastic film rolls with a non-metallized strip in the prior art.

Figure 1:
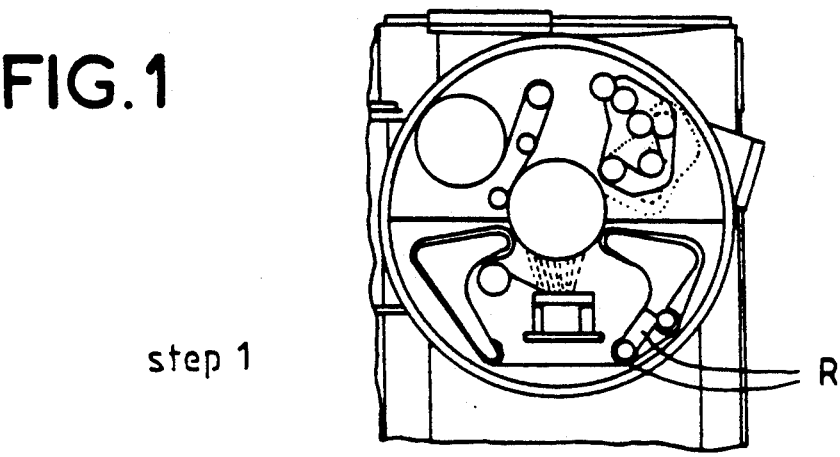
FIG. 1 represents the steps used to produce metallized flexible plastic film rolls with a non-metallized strip in the prior art.
Figure 1:
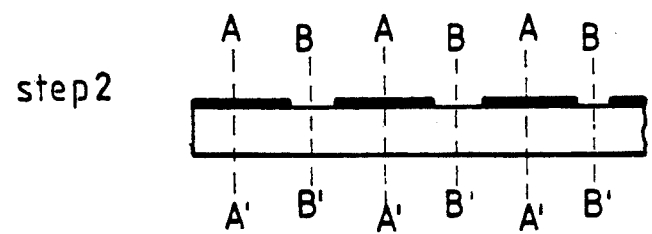
Figure 1:
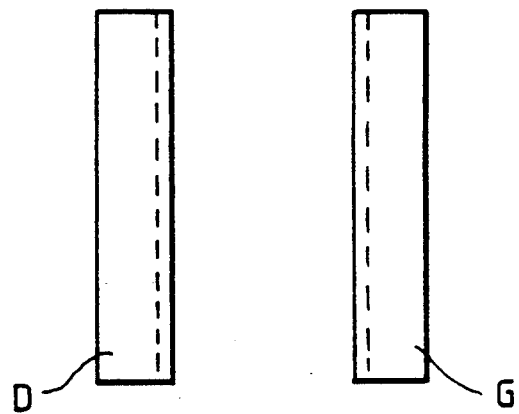

the first step is to metallize a wide flexible dielectric film, such as a polyester, polycarbonate, polysulfone or polypropylene film, by a metallization such as a vacuum vapor-deposit process; it is during this step that the non-metallized strips are produced using masking tape as shown by reference R on FIG. 1;

the second step is to cut the wide metallized flexible film in the center of the metallized areas (cuts A, A') and, simultaneously, in the center of the non-metallized strips (cuts B, B');

the third step is to wind the film to form rolls and then to sort the rolls into those with the same film width and the same non-metallized strip width.

This allows correctly-matched rolls to be obtained. Each pair of films contains a "left-hand strip" film (G) and a "right-hand strip" film (D). However, as was said earlier, the constitution of stocks of matched rolls using this method is far from being completely controlled.

Figure 2:
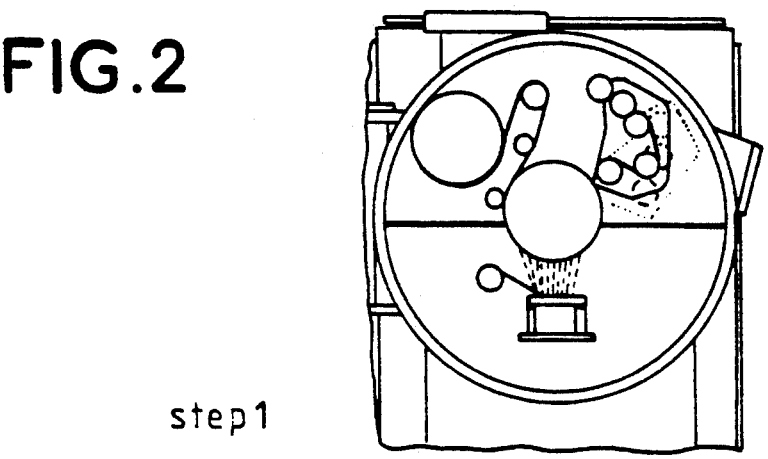
FIG. 2 represents the steps in the process to produce metallized flexible plastic film rolls with a non-metallized strip complying with the invention.
Figure 2:
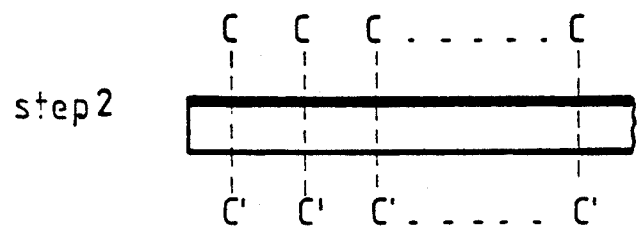
Figure 2:
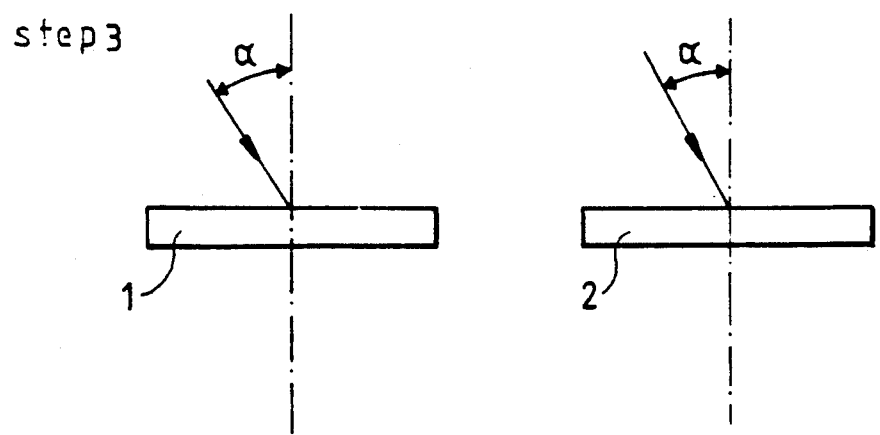

FIG. 2 describes the three steps in a process to produce metallized flexible plastic film rolls with a non-metallized strip complying with the invention.

The first step is to metallize a wide flexible dielectric film, such as a polyester, polycarbonate, polysulfone or polypropylene film, over its full width using a vacuum vapor-deposit process.

Here, there is no system to place the masking tapes in front of the metal vapor-deposit mechanism nor, indeed, any masking tapes; this eliminates the need to choose between various masking tape widths to produce various non-metallized strip widths.

The wide film metallization operation is therefore simplified.

The second step involves cutting wide metallized flexible film (cuts C, C') and winding the tapes thus created to form film rolls. The invention therefore has the advantage of eliminating the need to accurately position the blades in the non-metallized strips since, with the invention, the non-metallized strips do not exist at the cutting stage.

Figure 3:
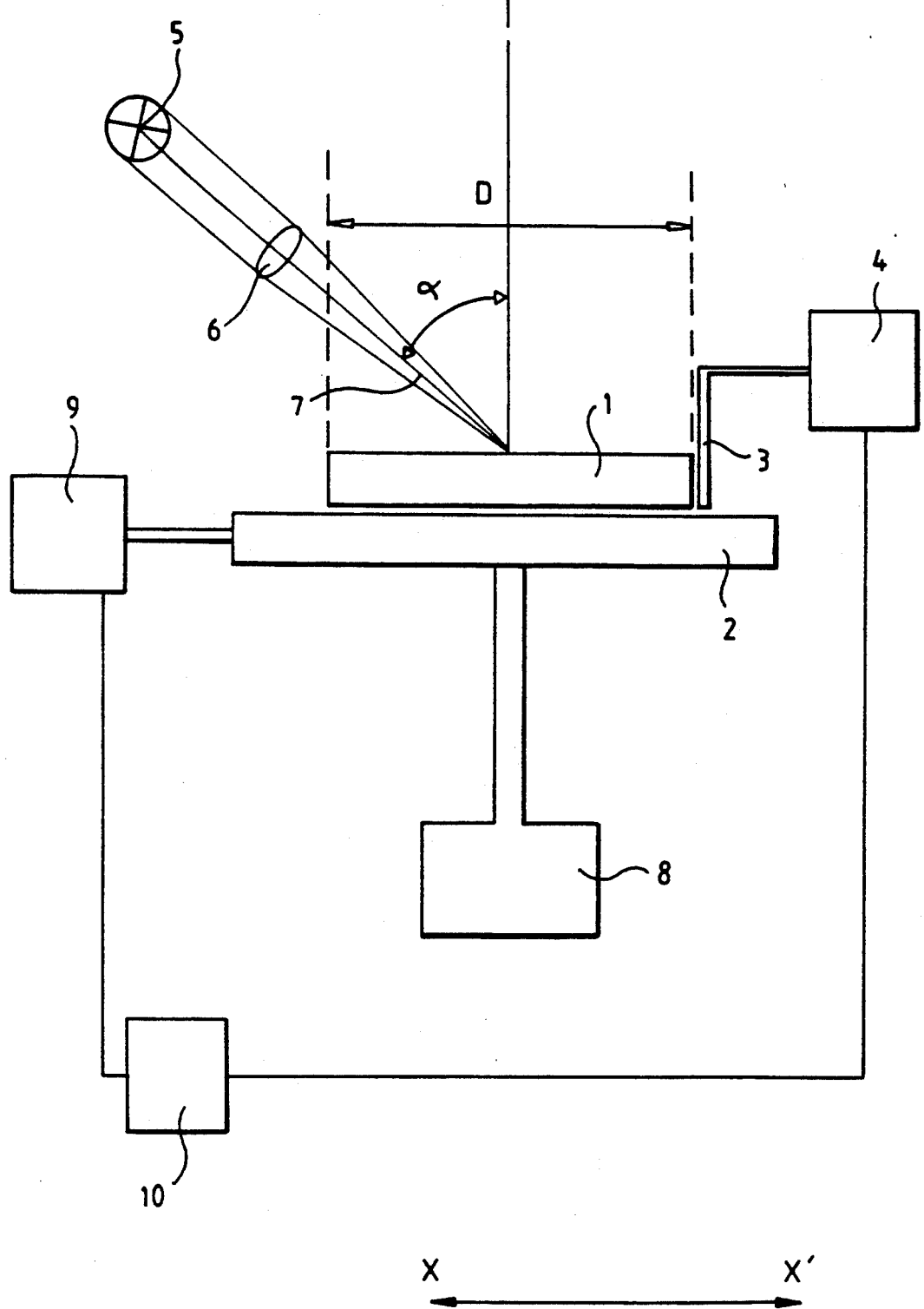
FIG. 3 represents, in greater detail, the production of the non-metallized strip on the metallized flexible plastic film rolls using a laser beam.

The third step is to produce the non-metallized strips on the metallized flexible plastic film rolls by applying a laser beam at an angle of incidence α. Since rolls are used in pairs to produce stacked capacitors, this step should preferably be applied to pairs of rolls 1, 2. The demetallization of the strip on the film roll is detailed in FIG. 3.

This figure represents the principle employed to demetallize the strip using an inclined laser beam.

Roll 1, on which a strip is to be demetallized, is mounted on a moving table 2. A sensor finger 3 then measures the roll diameter D.

This value is recorded by an electronic device 4.

A laser beam 5 is then applied to roll 1 at an angle of incidence α, via a lens 6 which focuses beam 7.

A YAG laser is used. However, for industry, it is obvious that other types of laser could be used.

The table 2 and roll 1 are then rotated at uniform speed by motor 8.

Motor 9 is started in turn to apply a cross-feed motion to the roll along axis X, X'.

Motor 9 imparts a cross-feed motion to the roll such that, when the demetallization operation has been completed, the entire surface of the roll has been exposed to the same number of laser beam impacts per unit area.

Consequently, the further the laser beam point of impact from the roll center, the slower will be the cross-feed movement.

The roll diameter D signal is applied to microprocessor 10 which controls motor 9 to correctly vary the roll cross-feed speed.

The properties of the plastic films used are such that the transmission factor remains high and varies little with the angle of incidence.

For example, when the angle of incidence changes from 20 to 40 degrees, the transmission factor changes from 92% to 88%.

One advantage of the demetallization process complying with the invention is, therefore, that the demetallization depth is modified by the beam angle of incidence while the beam power is held virtually constant. In addition, the higher the angle of incidence, the narrower the strip produced. It is thus possible to produce strips of approximately 0.05 mm. For all the operations described above, the angle of incidence varies from 5° to 70°.

Another advantage of the process lies in the ease of management of roll stocks.

Once the rolls have been produced, they are individually measured. This is not new compared to the prior art. On the other hand, the rolls are now measured before the non-metallized strip is produced.

We have seen that, to produce stacked capacitors, the rolls must be matched before being wound.

The new manufacturing process therefore makes it possible to prepare roll pairs with no non-metallized strips directly.

This allows better forecast management of the roll stock.

What is claimed is:

1. A process for the preparation of at least one non-metallized strip on the surface of a completely metallized flexible plastic film roll, comprising impinging a laser beam onto a lateral face of said roll at a non-zero angle of incidence relative to said lateral face of said roll to produce at least one non-metallized strip on the surface of said metallized flexible plastic film, said angle of incidence of the laser beam relative to the lateral face of said roll determining the width of the non-metallized strip.

2. A process as described in claim 1 in which the angle of incidence lies between 5° and 70°.

3. A process as described in claim 1 in which the entire lateral face of the roll is progressively exposed to the laser beam.

4. A process as described in claim 1 in which the required width of non-metallized strips is obtained by varying the angle of incidence of the laser beam.

5. A process as described in any of claims 1 to 4 in which the plastic films is a polyester, polycarbonate, polysulfone or polypropylene.

6. A process as described in any of claims 1 to 4 in which the metallization consists of aluminum, zinc or alloys containing aluminum, zinc or chromium.

7. A process as described in any of claims 1-4 for the preparation of a stacked capacitor further comprising the following steps:
   metallizing the full width of a wide flexible dielectric film;
   cutting the wide film into films of the required width;
   forming rolls from the completely metallized flexible plastic films;
   winding at least one pair of metallized film rolls with left-hand and right-hand non-metallized strips respectively to form a stacked structure of capacitors to be prepared;
   metallizing the lateral faces of the wound structure to create lateral electrical connections;
   cutting a master capacitor produced in this way into semi-finished capacitors;
   wrapping and encapsulating the semi-finished capacitors so prepared to produce finished capacitors.

8. A process as described in any of claims 1-4 for the preparation of a wound capacitor further comprising the following steps:
   metallizing of the full width of a wide flexible dielectric film;
   cutting the wide film into films of the required width;
   forming rolls from the completely metallized flexible plastic films;
   winding at least one metallized film to form a wound structure of the finished capacitors to be prepared;
   metallizing the lateral faces of the wound structure to create lateral electrical connections; and
   wrapping and encapsulating the semi-finished capacitors so prepared to produce finished capacitor.

* * * * *